United States Patent
Wittman

(10) Patent No.: US 7,818,794 B2
(45) Date of Patent: Oct. 19, 2010

(54) DATA TRAFFIC FILTERING INDICATOR

(75) Inventor: Brian Albert Wittman, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1028 days.

(21) Appl. No.: 10/517,574

(22) PCT Filed: Jun. 9, 2003

(86) PCT No.: PCT/US03/18191

§ 371 (c)(1),
(2), (4) Date: Dec. 9, 2004

(87) PCT Pub. No.: WO03/107590

PCT Pub. Date: Dec. 24, 2003

(65) Prior Publication Data

US 2005/0169282 A1 Aug. 4, 2005

Related U.S. Application Data

(60) Provisional application No. 60/388,082, filed on Jun. 12, 2002.

(51) Int. Cl.
*G08B 5/38* (2006.01)
(52) U.S. Cl. .................. 726/13; 726/22; 380/266
(58) Field of Classification Search ......... 713/150–167, 713/200–201; 370/400–406
See application file for complete search history.

(56) References Cited

U.S. PATENT DOCUMENTS

| | | | |
|---|---|---|---|
| 4,707,738 A | 11/1987 | Ferre et al. | |
| 5,809,252 A * | 9/1998 | Beighe et al. | 709/227 |
| 6,052,788 A | 4/2000 | Wesinger, Jr. et al. | |
| 6,119,236 A | 9/2000 | Shipley | |
| 6,185,624 B1 * | 2/2001 | Fijolek et al. | 709/239 |
| 6,189,035 B1 * | 2/2001 | Lockhart et al. | 709/229 |
| 6,219,786 B1 | 4/2001 | Cunningham et al. | |
| 6,243,815 B1 | 6/2001 | Antur et al. | |

(Continued)

FOREIGN PATENT DOCUMENTS

CN 1308745 8/2001

(Continued)

OTHER PUBLICATIONS

Ash Nallawalla, May 2002, ZoneAlarm Pro 3.0, PC Update, available at http://www.melbpc.org.au/pcupdate/2205/2205article5.htm, 4 pages.*

(Continued)

*Primary Examiner*—William R Korzuch
*Assistant Examiner*—Michael R Vaughan
(74) *Attorney, Agent, or Firm*—Robert D. Shedd; Paul P. Kiel; Guy H. Eriksen

(57) ABSTRACT

Disclosed are a method and bi-directional communication device, such as a cable modem, router, bridge, or other communication device adapted to communicate via a network and having a firewall, for identifying those packets associated with inappropriate activity. The communication device includes at least one user discernable indicator associated with the firewall. The at least one user discernable indicator contemporaneously indicates that a number of packets associated with the inappropriate activity has exceeded a threshold level.

18 Claims, 3 Drawing Sheets

U.S. PATENT DOCUMENTS

| | | | |
|---|---|---|---|
| 6,269,447 | B1 | 7/2001 | Maloney et al. |
| 6,282,546 | B1 | 8/2001 | Gleichauf et al. |
| 6,317,837 | B1 | 11/2001 | Kenworthy |
| 6,321,267 | B1 | 11/2001 | Donaldson |
| 6,321,338 | B1 | 11/2001 | Porras et al. |
| 6,389,532 | B1 | 5/2002 | Gupta et al. |
| 6,510,509 | B1 * | 1/2003 | Chopra et al. ............... 712/13 |
| 6,581,092 | B1 * | 6/2003 | Motoyama et al. .......... 709/219 |
| 6,798,777 | B1 * | 9/2004 | Ferguson et al. ............ 370/392 |
| 6,990,591 | B1 * | 1/2006 | Pearson ....................... 726/22 |
| 7,010,807 | B1 * | 3/2006 | Yanovsky .................... 726/24 |
| 7,116,675 | B2 | 10/2006 | Tateoka |
| 7,222,359 | B2 * | 5/2007 | Freund et al. ................. 726/3 |
| 7,340,770 | B2 * | 3/2008 | Freund ........................ 726/11 |
| 7,574,740 | B1 * | 8/2009 | Kennis ........................ 726/22 |
| 7,697,550 | B2 * | 4/2010 | Rada et al. .................. 370/401 |
| 2001/0044886 | A1 | 11/2001 | Cassagnol et al. |
| 2002/0062450 | A1 * | 5/2002 | Carlson et al. .............. 713/200 |
| 2002/0080771 | A1 | 6/2002 | Krumel |
| 2002/0080784 | A1 * | 6/2002 | Krumel ....................... 370/389 |
| 2002/0083168 | A1 * | 6/2002 | Sweeney et al. ............ 709/224 |
| 2002/0133586 | A1 | 9/2002 | Shanklin et al. |
| 2002/0178365 | A1 * | 11/2002 | Yamaguchi ................. 713/182 |
| 2002/0178383 | A1 * | 11/2002 | Hrabik et al. ............... 713/201 |
| 2003/0051026 | A1 * | 3/2003 | Carter et al. ................ 709/224 |
| 2003/0055962 | A1 * | 3/2003 | Freund et al. ............... 709/225 |
| 2003/0084349 | A1 * | 5/2003 | Friedrichs et al. ........... 713/201 |
| 2003/0106067 | A1 * | 6/2003 | Hoskins et al. ............. 725/119 |
| 2003/0115485 | A1 | 6/2003 | Milliken |
| 2004/0103021 | A1 * | 5/2004 | Scarfe et al. ................. 705/13 |
| 2004/0117834 | A1 * | 6/2004 | Karaoguz et al. ............. 725/80 |
| 2005/0235360 | A1 * | 10/2005 | Pearson ....................... 726/23 |
| 2006/0253903 | A1 * | 11/2006 | Krumel ....................... 726/13 |

FOREIGN PATENT DOCUMENTS

| | | |
|---|---|---|
| JP | 2002-063084 | 2/2002 |
| JP | 2002-124996 | 4/2002 |
| WO | WO 99/59071 | 11/1999 |
| WO | 00/54458 | 9/2000 |
| WO | 01/88731 A1 | 1/2001 |
| WO | 02/45380 A2 | 6/2002 |

OTHER PUBLICATIONS

Ray Geroski, Secure Client Machines with ZoneAlarm Pro 3.0, May 23, 2002, avialable at http://articles.techrepublic.com.com/5100-10878_11-1047955.html.*

Eric Grevstad, Date Unknown, ZoneAlarm 3.0 Review, Internet.com, avialable at http://articles.directorym.net/ZoneAlarm_Pro_3_0_Review-a878290.html.*

Search Report Dated Sep. 10, 2003.

Kondo, Mariko, "A Study on Internal Security Management of Network", IEICE Technical Report, vol. 95, No. 271, The Institute of Electronics, Information and Communication Engineers, Sep. 29, 1995, pp. 115-120. (Translation Will Follow Upon Availability).

English Language Translation for: Kondo, Mariko, "A Study on Internal Security Management of Network", IEICE Technical Report, vol. 95, No. 271, The Institute of Electronics, Information and Communication Engineers, Sep. 29, 1995, pp. 115-120. (Translation Only, Japanese language source reference earlier submitted Mar. 15, 2010).

* cited by examiner

DATA TRAFFIC FILTERING INDICATOR

CROSS-REFERENCE TO RELATED APPLICATIONS

This application claims the benefit, under 35 U.S.C. § 365 of International Application PCT/US03/18191, filed Jun. 9, 2003, which was published in accordance with PCT Article 21(2) on Dec. 24, 2003 in English and which claims the benefit of U.S. provisional patent application Ser. No. 60/388,082, filed Jun. 12, 2002, which is incorporated herein by reference in its entirety.

FIELD OF INVENTION

The present invention relates generally to broadband data transmission. More particularly, the invention relates to monitoring data traffic through communication devices having firewall programs adapted for use in network systems.

DESCRIPTION OF THE BACKGROUND ART

The increasing number of security breaches of networked computer equipment has led to hardware and software devices designed to provide security from viruses, worms, and other annoying, or irreversibly harmful computer programs designed to exploit an unprotected computer system. One popular technique of protecting a user or plurality of users on a network is to install a firewall program between, for example, the Internet and the gateway of an Intranet serving those user(s).

In particular, a firewall program is a set of related programs located at a network gateway server that protects the resources of a private network from users from other networks (e.g., the Internet). An organization or entity with an intranet that allows its employees/users access to the wider Internet typically installs a firewall program to prevent outsiders from accessing its own private data resources, and for controlling what outside resources its own users have access to.

The firewall program examines the data traffic through the gateway to determine whether to forward the data traffic to a particular destination. In particular, the firewall program examines data packets addressed to the network (LAN) where the firewall program resides. The firewall programs may be installed on a separate host computer, on a router, or other network hardware capable of receiving packetized information and hosting the firewall program.

Typical software-based firewall programs log events in a log file. The firewall programs do not provide contemporaneous feedback when, for example, a hacker is trying to infiltrate the network. Rather, a dialog window may subsequently be provided when a filtering event occurs. The dialog windows require user action to clear the screen. Repeated filtering by the firewall program repetitiously initiates the dialog window and requires constant user interaction to clear the screen, which may become annoying to the user. Many users simply disable the dialog window, and only keep the logging to the log file enabled. As such, there is a need to notify a system administrator or end-user of instances where data traffic is being blocked (i.e., filtered) by a firewall program in a network environment.

SUMMARY OF INVENTION

The disadvantages heretofore associated with the prior art are overcome by the present invention, a method and apparatus for contemporaneously indicating that a number of packets associated with the inappropriate activity has exceeded a threshold level.

In one embodiment, a method comprises examining data traffic to determine whether at least one of a plurality of rules has been violated, where the rules define indicators of inappropriate communication activity. In the case of a rule of a first class of the plurality of rules being violated, the data traffic violating the first class rule is filtered and a user discernable indicator is triggered.

In another embodiment, the apparatus is adapted to communicate via a network, comprising a firewall, for identifying those packets associated with inappropriate activity. At least one user discernable indicator is associated with the firewall, for contemporaneously indicating that a number of packets associated with the inappropriate activity has exceeded a threshold level.

In another embodiment, a cable modem comprises downstream processing circuitry, upstream processing circuitry, and a controller in communication with the downstream circuits, upstream circuitry, and a memory. A firewall program having associated with it a set of rules is resident in the memory and executable by the controller. The firewall is adapted to cause the examining of data packets from the downstream and upstream circuitry. A determination by the firewall that inappropriate activity exceeds a threshold level results in the triggering for at least one visual indicator. The at least one visual indicator is positioned proximate the cable modem and is discernable to a user.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, whenever possible, to designate identical elements that are common to the figures.

DETAILED DESCRIPTION OF THE INVENTION

The invention provides a user discernable indicator (e.g., source of light and/or sound) to indicate that a firewall program is filtering undesirable or inappropriate data traffic prior to such data traffic reaching a particular destination in a network. The invention will be primarily described within the context of a cable modem in a data communications system. However, it will be appreciated by those skilled in the art that other data exchange communications device, such as a router, a digital subscriber line (DSL) modem, or any other networked communication device having a firewall program associated therewith, may also incorporate and benefit from the present invention. The invention provides a visual indicator that contemporaneously indicates such filtering by a firewall program and enables end-users and system administrators to be quickly notified of any undesirable data traffic. Accordingly, the end-users/system administrators may therefore provide additional security measures to protect themselves from a sustained "attack" by a hacker, a "worm", or other harmful assault to the network.

Figure 1:
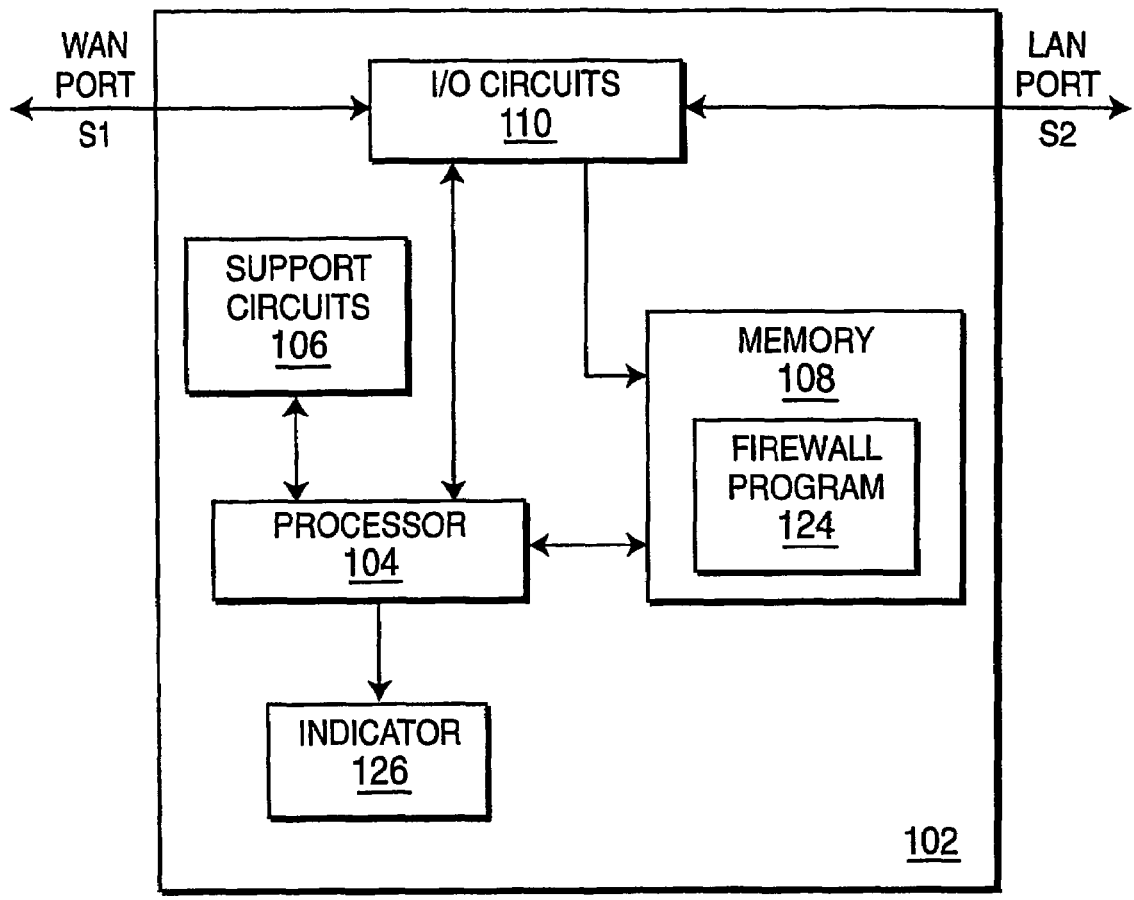
FIG. 1 is a block diagram of an exemplary multi-mode bi-directional communications device in accordance with the principles of the present invention.

FIG. 1 is a block diagram of an exemplary multi-mode bi-directional communications device 102 having a data-filtering indicator 126, in accordance with the principles of the present invention. The multi-mode bi-directional communications device may be a router, bridge, server, desktop computer, laptop computer, cable modem, personal data assistant (PDA), cellular phone, or any other communication device having, or in communication with a firewall program that examines and filters data packets. Referring to FIG. 1, the multi-mode, bi-directional communications device (hereinafter "communications device") 102 is part of a data communications system 100. The communications device 102 comprises at least one processor 104, support circuits 106, I/O circuits 110, memory 108 having a firewall program 124 installed therein, and an indicator 126 for indicating data packet filtering events.

The processor 104 cooperates with the conventional support circuits 106 (e.g., clocks, power supplies, bus controllers, among other support circuitry) and the memory 108 in executing software routines stored in the memory 108, such as a firewall program 124. The memory 108 may include volatile memory (e.g., RAM), as well as non-volatile memory, such as one or more disk drives. As such, it is contemplated that some of the process steps discussed herein as software processes may be implemented within hardware, for example, as circuitry that cooperates with the processor 104 to perform various steps. The I/O circuitry 110 forms an interface between various functional elements communicating with the I/O circuitry 110. For example, in the embodiment of FIG. 1, the I/O circuits 110 of the communication device 102 communicate between a wide area network (WAN) and a local area network (LAN) via signals S1 and S2.

Although the communication device 102 FIG. 1 is depicted as including a general-purpose computer, which is programmed to perform various control functions in accordance with the principles of the present invention, the invention may be implemented in hardware, for example, as an application specific integrated circuit (ASIC). As such, the process steps described herein are intended to be broadly interpreted as being equivalently performed by software, hardware, or a combination thereof.

The firewall program 124 is capable of examining and filtering data packets (e.g., IP data packets) sent from an originating source node (e.g., file server on a WAN) to a destination node (e.g., local computer on a LAN). In particular, the firewall program 124 comprises a set of related programs that protect the resources of a private network from users from other networks. The firewall program 124 examines some or all of the network packets to determine whether to forward the packets to its destination. That is, the filtering firewall program operates at the network level. Data is only allowed to pass through the communications device 102 containing the firewall program 124 if the packet configuration does not violate specified rules.

The firewall program rules are established, for example, by an administrator of a LAN (default rules may also be used). The rules reflect policy considerations by an organization to provide security by prohibiting unwanted data from entering the organization's LAN. For example, an organization may decide that particular Internet web sites should not be viewed by the organization's employees, or that some employees should be denied any Internet access. As such, the rules include programming to restrict some or all hypertext transfer protocols (HTTP). Additional rules include restricting data packets that may be deemed harmful to the LAN and end-users, such as worms, as well as unauthorized persons (i.e., "hackers") trying to infiltrate the LAN. Profiles of inappropriate data activity may be compared to actual activity to determine if the actual data activity is inappropriate.

The I/O circuit 110 receives the incoming data packets and stores the packets in memory 108, where the firewall program 124 examines at least the packet type, source address, destination address, and port information contained in each packet. If the examined packet (or a group of packets considered as a whole) does not violate any of the firewall program rules, the examined packet is further routed to the packet's destination address. However, if the examined packet (or a group of packets considered as a whole) is deemed to violate the rule, then the packet(s) may be filtered (i.e., restricted) from going any further in the network. A method of filtering data packets is described below in further detail with regard to FIG. 3.

Once a packet or a group of packets exceeding a particular threshold level is filtered by the firewall program 124, the processor 104 provides a control signal to the indicator 126. In one embodiment, the indicator is a light emitting diode (LED), which provides a light signal to signify the packets being actively filtered. In a second embodiment, the indicator may be a speaker to provide an audibly discernable sound (e.g., a "beep") to notify the administrator/end-user that the packets are being filtered. In either embodiment, the indicator provides contemporaneous notification that the network is being violated in some manner not permitted by the firewall program rules.

In one embodiment, the indicator (i.e., LED or speaker) is positioned proximate the communication device 102. For example, the LED is located on an outer surface of the communication device 102 is a position easily viewable by an administrator/end-user. In another embodiment, the firewall program 124 may provide an instruction signal to an operating system or application program running on a computer device to provide an indicator on a computer screen. For example, a red light may be provided on an icon in the system tray of a WINDOWS™ operating system, which is installed on a desktop or laptop computer.

Figure 2:
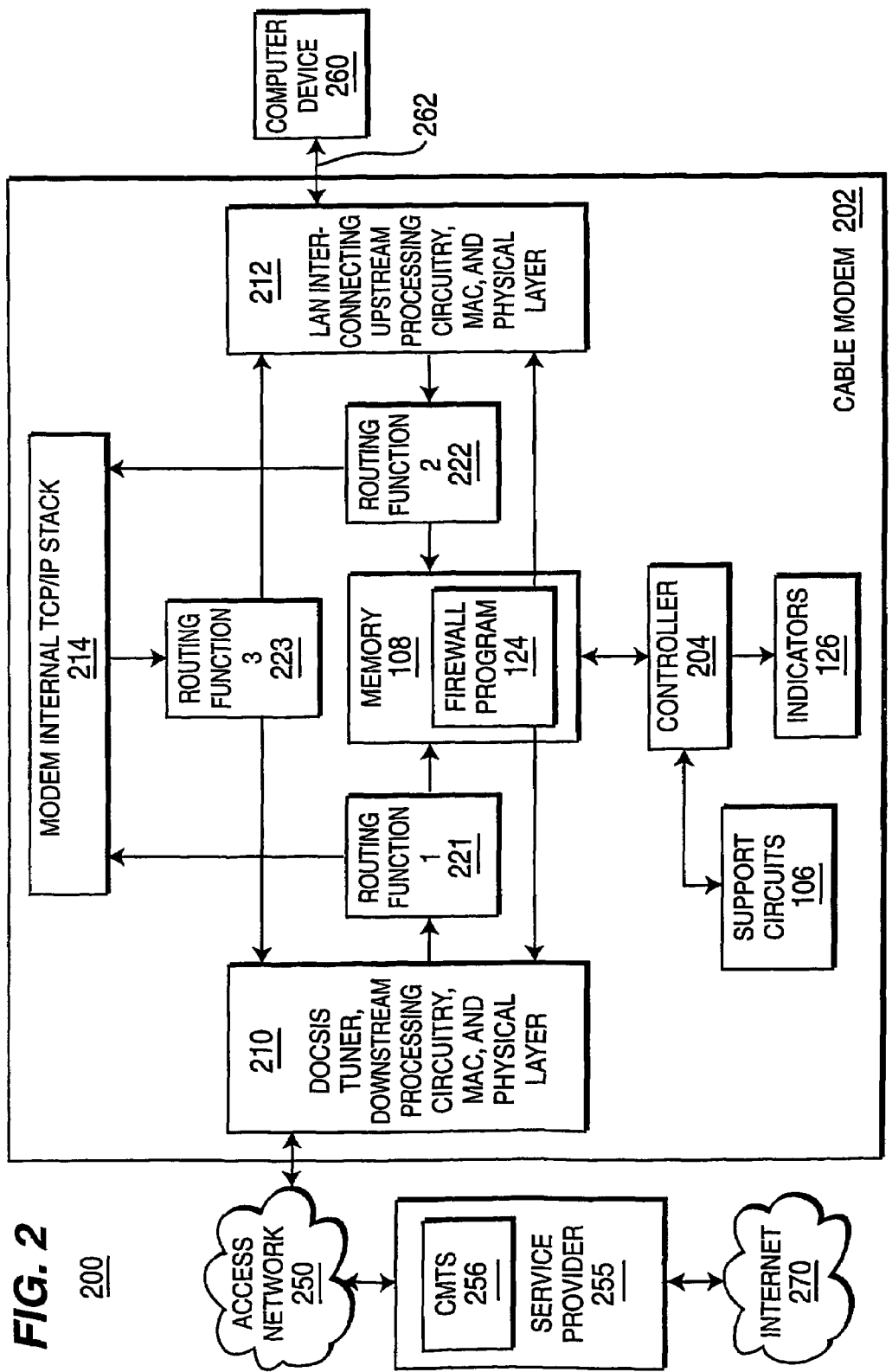
FIG. 2 is an exemplary block diagram of a cable modem in accordance with the principles of the present invention.

FIG. 2 is an exemplary block diagram of a cable modem 202 having a data-filtering indicator 126, in accordance with the principles of the present invention. In accordance with one embodiment of the invention, a data communications system 200 comprises a service provider 255 that provides electronically transmitted, digital data illustratively from the Internet 270 to an end user having an input/output (I/O) device 260, such as a computer, hand-held device, laptop, or any other device capable or transmitting and/or receiving data. The cable modem 202 is coupled to a cable modem termination system (CMTS) 256 at the head-end of the service provider 255 via a cable transport network 250. Typically, the service provider 255 includes one or more host servers, such as dynamic host configuration protocol (DHCP) servers (not shown) for allocating an IP address to the subscriber premise equipment (i.e., the computer device 260).

The service provider 255 may be any entity capable of providing low, medium and/or high-speed data transmission, multiple voice channels, video channels, and the like. In particular, data is transmitted via radio frequency (RF) carrier signals by the service provider 255 in formats such as the various satellite broadcast formats (e.g., Digital Broadcast Satellite (DBS)), cable transmission systems (e.g., high definition television (HDTV)), digital video broadcasting ((DVB-C) (i.e., European digital cable standard)), and the like. The service provider 255 provides the data over the cable transport network 250.

In one embodiment, the cable transport network 250 is a conventional bi-directional hybrid fiber-coax (HFC) cable network, such as specified under the North American or European DOCSIS standards. In particular, the HFC network comprises various components (not shown) such as a mixer for mixing a cable TV RF signal with a RF data signal from the CMTS, an optical transmitter (OTX) for converting the mixed RF signal into an optical signal, an optical network unit (ONU) for converting the optical signal back to the mixed RF signal in downstream, as well as converting an RF signal from each of the subscriber premises equipment 260 to an optical signal in the upstream path, a tap for distributing the transmitted mixed RF signal to each of the subscriber premise equipment 260 via the cable modem 202, and an optical receiver (ORX) for converting the optical signal from the ONU back to the RF signal.

The exemplary cable modem 202 is utilized to provide downstream broadband data signals from the service provider 255 to the computer device 260 of a data communications system 200. Additionally, the exemplary cable modem 202 is utilized to transfer upstream baseband data signals from the illustrative computer 260 back to the service provider 255.

In operation, the CMTS 256 converts digital data to a modulated RF signal and provides such modulated signals downstream, via the HFC transport network 250 to the cable modem 202, where the RF signals are received, tuned, and filtered to a predetermined intermediate frequency (IF) signal. The IF signal is then demodulated into one or more respective baseband signals, and otherwise processed into, illustratively, data packets. The data packets are further transmitted, illustratively, through cabling 262 (e.g., Ethernet, universal serial bus (USB), coaxial cable, and the like) to the computer device 260.

Similarly, a user of the computer device 260 may send data signals to the cable modem 202 via the cabling 262. The cable modem 202 receives data signals from the computer device 260, and then modulates and upconverts the data signals onto a RF carrier for upstream transmission back to the service provider 255, via the cable transport network 250.

For a better understanding of the data packet flow through the cable modem 202, the downstream hardware, as well as the upstream hardware, are each represented by single downstream and upstream blocks. The downstream and upstream hardware refer to the RF bi-directional path between the modem and the CMTS 256. Specifically, at the head-end of the service provider network, the CMTS downstream RF interface (CMTS-DRFI) and upstream RF interface (CMTS-URFI) (both generally shown as incorporated elements of the CMTS 256) provides the interfaces between the cable modem system and the downstream RF path, which terminate in the cable modem, illustratively at the customer premises 260. The CMTS-DRFI and CMTS-URFI operate in conjunction to provide bi-directional communications.

The downstream processing circuitry 210 of the cable modem 202 typically includes various components, such as a tuner, filters, demodulator, a controller 226, and other downstream processing circuitry, such as a medium access controller (MAC), which is also used for upstream processing.

The downstream processing circuitry 210 selectively tunes, demodulates, and otherwise "receives" at least one of a plurality of downstream data signals from the CMTS 256 in response to a selection signal provided by the controller 204. A high-pass filter (HPF) passes all downstream data signals to the tuner, which downconverts the received downstream RF signals from the HPF to a predetermined IF frequency signal. The IF signals are demodulated by the demodulator circuitry to provide one or more respective digital baseband signals. The digital baseband signals are sent to the medium access controller (MAC), where the received signals (e.g., MPEG packets) are de-encapsulated and formed into a bitstream for subsequent transport to the computer device 260, as managed by controller 204.

Prior to transport to the computer device 260, the packets are sent either to an internal TCP/IP stack 214 or to the firewall program 124 for examination, as discussed in further detail below. Once the packets are deemed to comply with the firewall program rules, the MAC, controller 204, and other digital circuitry may further process the packetized data (e.g., attach or encapsulate in appropriate transport packets as required) and then distribute the processed, packetized data to the computer device 260 (or other information appliance). In particular, the MAC sends the packetized bitstream to the controller 204, where the data is processed (e.g., formatted) for interface with the computer device 260. The controller 204 transfers the formatted packetized bit stream (via cabling 262) to the computer device 260 for further processing (e.g., extraction and upconversion of the data).

The cable modem 202 further comprises upstream processing circuitry 212, which typically includes various components such as, the upstream physical layer elements, an upstream medium access controller, a modulator, a low-pass filter, and other upstream processing circuitry (e.g., amplifiers, voltage regulators, and the like). The cable modem 202 receives signals (e.g., command signals) from the computer device 260 for subsequent transmission to a destination via the service provider 255. In particular, a user sends data, data requests, or some other user request to the service provider 255 via the cable modem 202. The cable modem 202 receives user requests, where the MAC and upstream processing circuitry format, encapsulate, and upconvert the signals for transport. The modulator modulates (e.g., QPSK or 16QAM) the upconverted signals along the upstream signal path to the CMTS 256.

For the embodiments of FIGS. 1 and 2, the physical layer of the cabling 262 may illustratively include Ethernet, coaxial cables, FDDI, ISDN, ATM, ADSL, CAT 1-5 cabling, USB, HomePNA, wireless data links (e.g., 802.11 or Bluetooth standard wireless links), a power line carrier, among others.

Referring to FIG. 2, the blocks and paths between the blocks primarily represent functional data movement through the cable modem 202, rather than indicating actual hardware blocks.

In particular, data packets sent, for example, from the CMTS 256 (service provider 255) via the access network 250, are received by the downstream processing circuitry 210. The downstream packets received by the downstream processing circuitry are routed either to an internal TCP/IP stack 214 or to the firewall program 124 for further processing.

The internal TCP/IP stack refers to the layers (TCP and IP layers) through which data passes at both client and server ends of a data exchange. The TCP/IP stack corresponds to the transport layer (4) and session layer (5) under the OSI model, which respectively manages the end-to-end control and error-checking, as well as session and connection coordination of communication exchanges between applications at each end.

For example, if the packets are a simple network management protocol (SNMP) message from a cable head-end 255 to control the cable modem 202, the SNMP packets are routed via a first routing function 221 to the TCP/IP stack 214. If the packets are addressed for the computer device 260 (e.g., a PC attached to the cable modem 202), such as HTTP packets, the routing function 222 transfers the HTTP packets to the firewall program 124 provided in the memory 108 of the cable modem 202.

Similarly, packets received from the upstream processing circuitry (i.e., the MAC and physical layer elements) 212 of the cable modem 202 are routed by a second routing function 222 to either the internal TCP/IP stack 214 or firewall program 124. For example, if the packets are a request to view the cable modem's internal diagnostic web page (served via an internal HTTP server (not shown)), the packets are routed to the TCP/IP stack 214. Alternatively, if the packets are to be sent over the Internet, then the second routing function 222 routes the packets to the firewall program 124.

In the case where the packets are immediately routed to the TCP/IP stack 214, instead of the firewall program 124, a third routing function 223 enables further routing of the packets from the TCP/IP stack 214 to the MAC and physical layer elements of either the upstream or downstream processing circuitry 212 and 210. For example, if the packets are HTML data from an internal web page (not shown) of the cable modem 202 that are to be displayed on a browser of the user's PC, the packets are routed, via the third routing function 223, from the TCP/IP stack 214 to the upstream processing circuitry (i.e., the MAC and physical layer elements) 212. Alternately, if the packets are, illustratively, responses to an SNMP request message from the cable head-end, the packets are routed, via the third routing function 223, to the downstream processing circuitry (i.e., the MAC and physical layer elements) 210.

As previously described with respect to FIG. 1, the firewall program 124 examines each received packet and determines whether the examined packets comply with the rules set forth therein to help ensure network security and apply organizational or end-user policies of the network. Once the firewall program 124 determines that a particular packet (or group of packets in some instances discussed below) is to be restricted from proceeding to the intended destination address of the packet, the controller 204 of the cable modem 202 sends a signal to one or more indicators 126 to notify the administrator/end-user of a data-filtering event.

Figure 3:
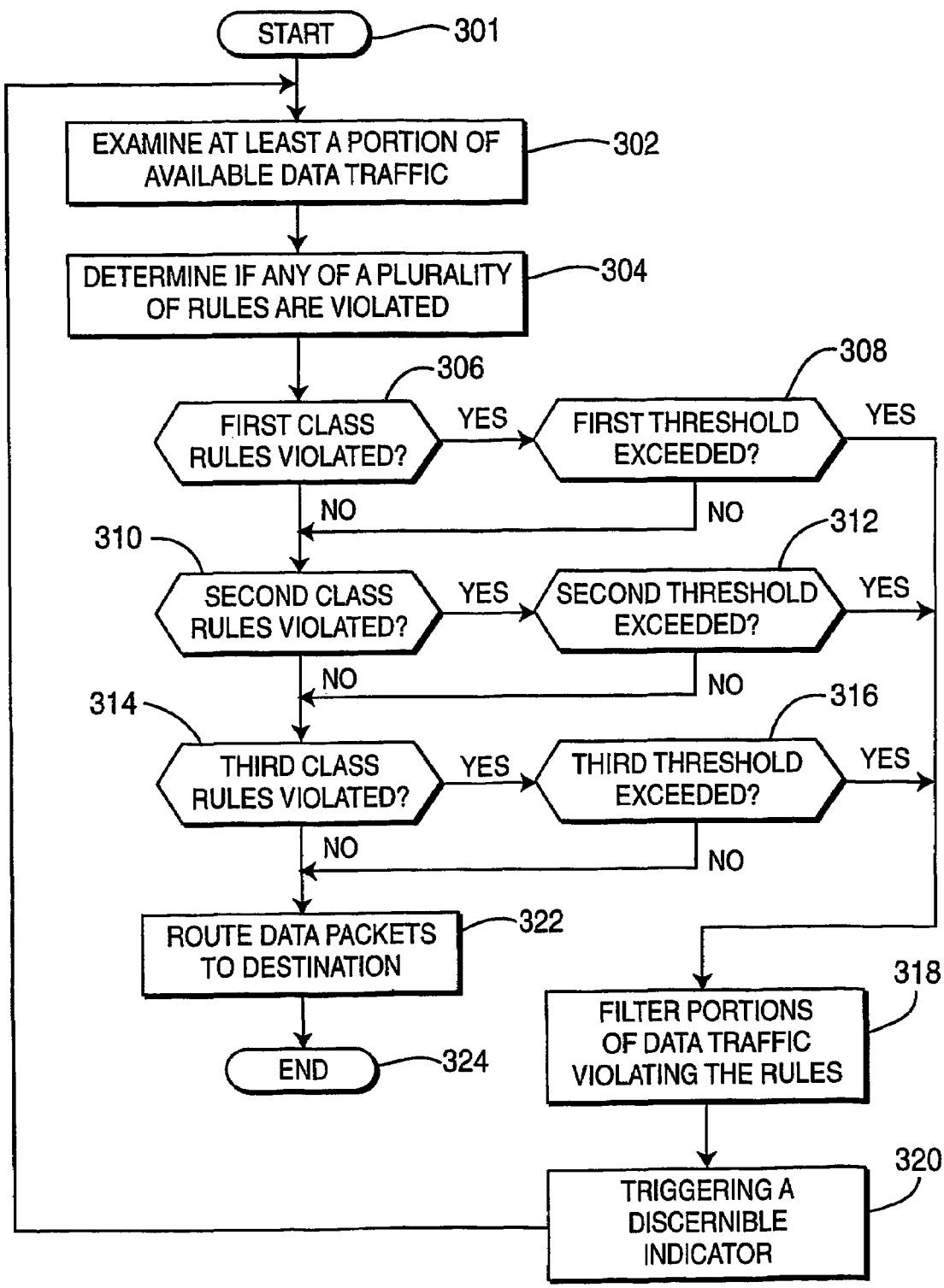
FIG. 3 is a flowchart of a method in accordance with the principles of the present invention.

FIG. 3 is a flowchart of a method 300 for providing a discernable indicator during a data-filtering event using the exemplary devices of FIGS. 1 and 2, in accordance with the principles of the present invention. The method 300 starts at step 301 where, for example, the firewall program 124 receives at least one packet from the downstream or upstream processing circuitry 210 and 212 for examination. At step 302, the firewall program 124 examines at least a portion of available data traffic. That is, the firewall program 124 examines a portion or all of the received data packets, depending on the policy and security levels set forth in the firewall program rules.

At step 304, the firewall program determines if any of the rules have been violated by the examined data packet(s). It is noted that the firewall program rules may include various levels of priority or ranking. That is, high-ranking rules (e.g., first class rules) may be defined illustratively for groups of data packets that are identified as an infiltration or attack by an unauthorized source (e.g., a hacker). Additionally, intermediately ranked rules (e.g., second-class rules) may include less harmful viruses or other lower priority types of undesirable data packets, while lower ranked rules (e.g., third class rules) may include the blocking of particular data packet destination addresses of Internet domains and web sites. It is noted that the prioritization of rules and the number of classes, if any, are subject to the design configuration of the firewall program 124 and based upon policy and security considerations of the organization accessing a network.

At step 306, a determination is made as to whether a first class rule has been violated. If the determination is affirmatively answered, then at optional step 308 the firewall program 124 determines whether a first threshold has been exceeded. That is, the firewall program 124 checks if a particular sample of data packets has violated one of the first class rules. If the threshold at optional step 308 has been exceeded, then the method 300 proceeds to step 318.

At step 318, the firewall program filters the data packets that violate the determined firewall program rules. The firewall program 124 interacts with the controller 204 to examine and filter the data packets. At step 320, the controller 204 sends a signal to the indicator 126 to provide a discernable indication to the administrator or end-user that the firewall program is filtering data packets. In one embodiment, a display device such as a light emitting diode (LED) is positioned at an outer surface (e.g., cover) of the cable modem 202 that is highly viewable by the administrator or end-user. The indicator 126 provides a contemporaneous real-time indication of a filtering event.

If the determination is negatively answered at step 306, or the first class rules have been violated but the threshold is not exceeded in optional step 308, then the method 300 proceeds to step 310. At step 310, the firewall program 124 determines whether a second-class rule has been violated. If the determination is affirmatively answered at step 310, the method 300 proceeds to optional step 312. At optional step 312, the firewall program 124 determines whether a first threshold has been exceeded. That is, the firewall program 124 checks if a particular sample of data packets have violated one of the second class rules prior to performing the step of filtering the data packets (step 318). If the threshold at optional step 312 has been exceeded, then the method 300 proceeds to steps 318 and 320 as discussed above. If however, in step 310, the second-class rules have not been violated, or the second-class rules have been violated but the threshold is not exceeded in optional step 312, the method 300 proceeds to step 314.

At step 314, the firewall program 124 determines whether a third class rule has been violated. If the determination is affirmatively answered at step 314, the method 300 proceeds to optional step 316. At optional step 316, the firewall program 124 determines whether a third threshold has been exceeded. That is, the firewall program 124 checks if a particular sample of data packets have violated one of the third class rules prior to performing the step of filtering the data packets (step 318). If the threshold at optional step 316 has been exceeded, then the method 300 proceeds to steps 318 and 320 as described above. If however, in step 314 the third class rules have not been violated, or the third class rules have been violated but the third threshold is not exceeded in optional step 316, the method 300 proceeds to step 322.

At step 322, the firewall program 124 has completed examining the data packets with regard to the policy and security requirements set forth in the firewall program rules, without detecting a rule violation. Accordingly, at step 322, the data packets are deemed safe for further processing in the cable modem 202 and transport to their destinations, as set forth in the packet destination address. The method 300 then proceeds to step 324, where the method 300 ends.

Optional steps 308, 312, and 316 provide a threshold level that must be exceeded before the firewall program 124 begins to the filtering step 318. It is noted that the threshold level is set as a function of the policy and security considerations of the organization or end-user utilizing the firewall program. Thus, a threshold level may be set to a single incident, meaning that upon a single packet violating a particular rule, the filtering step 318 is initiated immediately. This scenario would most likely apply to the high ranked (first class) rules of steps 306 and 308. Greater threshold levels may be used for lower ranked rules, such as progressively or in any other manner deemed adequate with regard to the policies and security considerations of the firewall program 124.

The method 300 of FIG. 3 describes that the filtering of data packets at step 318 and triggering of the indicator at step 320 occur only after a threshold level (e.g., steps 308, 312, and 316) has been exceeded. However, in an alternate embodiment, the firewall program 124 may filter out all data packets violating a particular firewall program rule, but will only trigger the indicator if the threshold level has been exceeded. For example, all packets found violating the third class rules in step 314 are immediately filtered, however, the indicator 126 will only be triggered once the threshold level of illustrative step 316 has been exceeded. It is noted that any configuration of filtering and triggering the indicator may be provided to satisfy the policy and security concerns of an organization utilizing a network.

It is further noted that the indicator may comprise more than one type of indicator. For example, a first LED may be utilized to indicate a general filtering event by the firewall program 124, while a second LED may be utilized in conjunction with the first LED to indicate any malevolent types of filtering events. For example, a so-called "Code Red" worm that typically generates relatively harmless address resolution protocol (ARP) traffic may only trigger a first LED (e.g., yellow LED) used for general filtering events. However, a more important attack such as a systematic probing of a computer port, may trigger a second LED (e.g., red LED) to indicate filtering of a data packet that violates a high ranked rule.

Although various embodiments that incorporate the teachings of the present invention have been shown and described in detail herein, those skilled in the art can readily devise many other varied embodiments that still incorporate these teachings.

The invention claimed is:

1. An apparatus adapted to communicate via a network, comprising:
a firewall including a set of rules for identifying packets associated with inappropriate activity, the rules in the set being separated into a plurality of classes; and
an indicator device for providing a plurality of user discernable indicators, wherein each of the plurality of user discernable indicators is associated with a different one of the plurality of classes and is visually discernable, and wherein a respective one of said plurality of user discernable indicators is triggered if one or more of the rules corresponding to one of said plurality of classes associated with the respective one of said plurality of user discernable indicators is violated,
wherein the rules in the set are prioritized such that each of the plurality of classes represents a respective different one of a plurality of priority levels,
wherein each of the plurality of user discernable indicators except a particular one is associated with the respective different one of the plurality of classes, the particular one of the plurality of user discernable indicators being associated with an affirmative status that filtering is being contemporaneously performed for any of the packets that violate the one or more rules, and wherein the particular one of the plurality of user discernable indicators along with the respective one of the plurality of user discernable indicators are concurrently triggered, only when a number of the packets that violate the one or more rules exceeds a pre-specified threshold to indicate that the filtering any of the packets that violate the one or more rules is being contemporaneously performed.

2. The apparatus of claim 1, wherein the plurality of user discernable indicators comprises a highlighted icon displayed on a computing device.

3. The apparatus of claim 1, wherein the firewall filters any of the packets that violate the one or more rules irrespective of a number of the packets that violate the one or more rules, but only triggers the respective one of the plurality of user discernable indicators when the number of the packets that violate the one or more rules exceeds a pre-specified threshold.

4. The apparatus of claim 1, wherein only the particular one of the plurality of user discernable indicators is triggered if the one or more of the rules is violated, the filtering is performed by the firewall program, and the number of the packets that violate the one or more rules does not exceed the pre-specified threshold.

5. The apparatus of claim 1, wherein whether the respective one of the plurality of user discernable indicators is triggered or not is based on which of the plurality of priority levels is involved with respect to a corresponding rule violation.

6. The apparatus of claim 1, where each of the plurality of classes uses a different one of a plurality of thresholds with respect to how many violating ones of the packets must be detected before filtering is commenced, the plurality of thresholds being end-user settable.

7. A method, comprising:
defining a set of rules to detect inappropriate communication activity on a computer or network;
separating the rules in the set into a plurality of classes;
associating each of the plurality of classes with a different one of a plurality of user discernable indicators that are each visually discernable;
examining data traffic to determine whether at least one of the rules has been violated; and
in the case that at least one of the rules of a first one of said plurality of classes has been violated, filtering said data traffic violating the at least one of the rules of the first one of said plurality of classes, providing a user discernable notification of said violation by triggering a respective one of the plurality of user discernable indicators associated with the first one of said plurality of classes, and wherein the rules in the set are prioritized such that each of the plurality of classes represents a respective different one of a plurality of priority levels,
wherein each of the plurality of user discernable indicators except a particular one is associated with the different one of the plurality of classes, and the method further comprises:
associating the particular one of the plurality of user discernable indicators with an affirmative status that filtering is being contemporaneously performed for any of the packets that violate at least one of the rules; and
in the case of the rule of at least a first class from among the plurality of classes being violated and a number of packets violating the rule of at least the first class exceeding a pre-specified threshold, providing a user discernable notification of the filtering being contemporaneously performed by triggering, concurrently with the triggering of the respective one of the plurality of user discernable indicators, the particular one of the plurality of user discernable indicators associated with the affirmative status that the filtering is being contemporaneously performed.

8. The method of claim 7, further comprising:
determining if a first threshold level of rule violation has been exceeded prior to filtering said data traffic.

9. The method of claim 7, further comprising:
determining if a first threshold level of rule violation has been exceeded prior to triggering the user discernable indicator.

10. The method of claim 7, wherein the data traffic includes a number of packets that violate the at least one of the rules of the first one of the plurality of classes, and wherein the method filters the packets that violate the at least one of the rules of the first one of the plurality of classes, irrespective of the number of packets that violate the one or more rules, but only triggers the respective one of the plurality of user discernable indicators when the number of packets that violate the at least one of the rules of the first one of the plurality of classes exceeds a pre-specified threshold.

11. The method of claim 7, wherein in the case of the rule of at least the first class being violated and the number of packets violating the rule of at least the first class not exceeding the pre-specified threshold, only providing the user discernable notification of the filtering without providing the user discernable notification of the violation.

12. The method of claim 7, wherein whether the respective one of the plurality of user discernable indicators is triggered or not is based on which of the plurality of priority levels is involved with respect to a corresponding rule violation.

13. A cable modem, comprising:
downstream processing circuitry;
upstream processing circuitry;
a controller in communication with said downstream circuits, upstream circuitry, and a memory;
a firewall program including a set of rules for identifying packets associated with inappropriate activity, the rules being separated into a plurality of classes, said firewall program being resident in said memory and executable by said controller to cause examining data of packets from said downstream and upstream circuitry; and
a plurality of user discernable indicators that are each visually discernable, wherein each of the plurality of user discernable indicators is associated with a different one of the plurality of classes and wherein a respective one of said plurality of user discernable indicators is triggered if one or more of the rules corresponding to one of said plurality of classes associated with the respective one of said plurality of user discernable indicators is violated, and wherein the rules in the set are prioritized such that each of the plurality of classes represents a respective different one of a plurality of priority levels,
wherein the firewall program is executable by said controller to cause filtering any of the packets that violate at least one of the rules, and wherein each of the plurality of user discernable indicators other than a particular one is respectively associated with the different ones of the plurality of classes, the particular one of the plurality of user discernable indicators being associated with an affirmative status that filtering is being contemporaneously performed, and wherein the particular one of the plurality of user discernable indicators is triggered, concurrently with the triggering of the respective one of the plurality of user discernable indicators, if the one or more of the rules is violated, the filtering is performed by the firewall program, and a number of the packets that violate the one or more rules exceeds a pre-specified threshold.

14. The cable modem of claim 13, wherein said plurality of user discernable indicators comprises a first LED for signifying a filtering event and a second LED for signifying filtering data packets deemed pernicious in said set of rules.

15. The cable modem of claim 13, wherein said plurality of user discernable indicators comprises a highlighted icon displayed on a computer device.

16. The cable modem of claim 13, wherein the firewall program is executable by said controller to cause filtering of any of the packets that violate the one or more rules irrespective of a number of the packets that violate the one or more rules, but wherein the respective one of the plurality of user discernable indicators is triggered only when the number of packets that violate the one or more rules exceeds a pre-specified threshold.

17. The cable modem of claim 13, wherein only the particular one of the plurality of user discernable indicators is triggered if the one or more of the rules is violated, the filtering is performed by the firewall program, and the number of the packets that violate the one or more rules does not exceed a pre-specified threshold.

18. The cable modem of claim 13, wherein whether the respective one of the plurality of user discernable indicators is triggered or not is based on which of the plurality of priority levels is involved with respect to a corresponding rule violation.

* * * * *